Jan. 24, 1956  G. T. DAIN ET AL  2,732,428
REGENERATIVE REPEATERS FOR USE IN TELEGRAPH SYSTEMS
Filed Jan. 4, 1951  4 Sheets-Sheet 2

INVENTORS
Gordon Taylor Dain
Arthur Victor Williams
BY
Dearie Steinberg
ATTORNEY

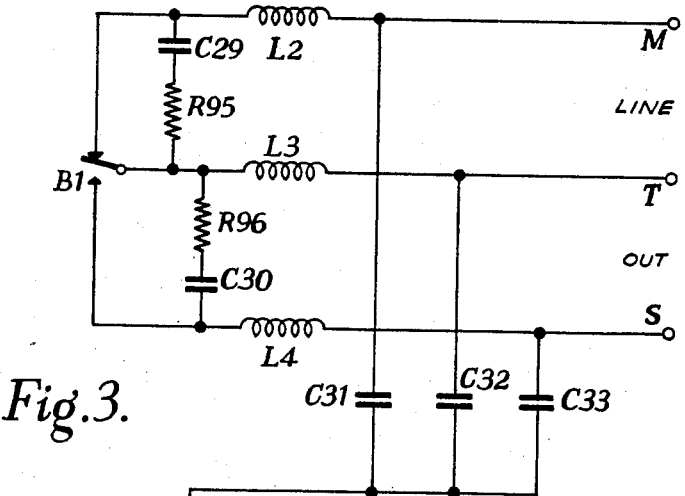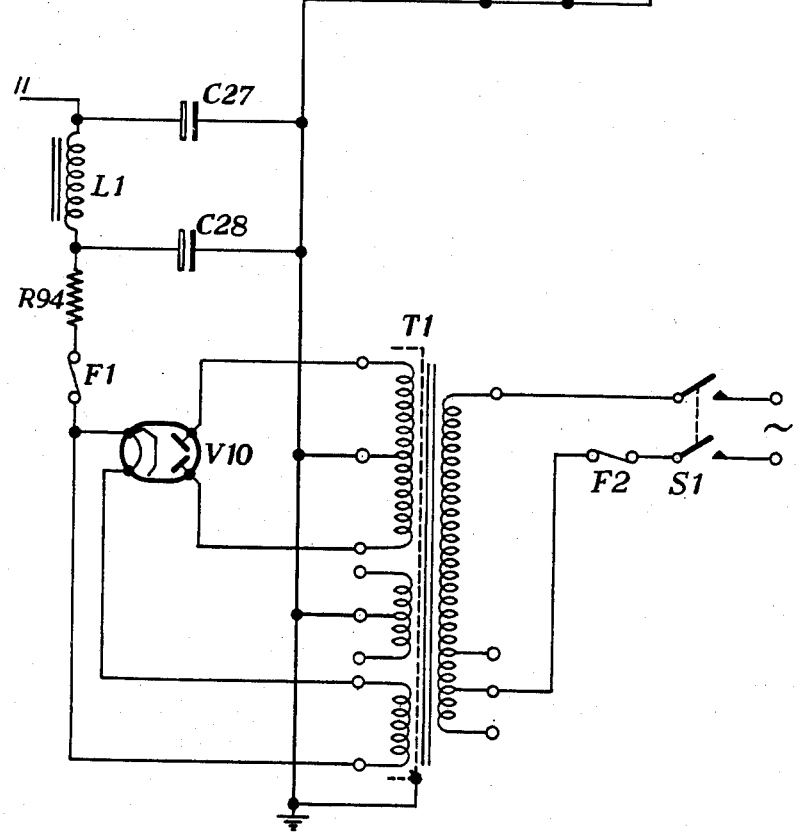
Fig. 3.

Jan. 24, 1956

G. T. DAIN ET AL 2,732,428

REGENERATIVE REPEATERS FOR USE IN TELEGRAPH SYSTEMS

Filed Jan. 4, 1951

4 Sheets-Sheet 4

INVENTORS
Gordon Taylor Dain
Arthur Victor Williams
BY
ATTORNEY

United States Patent Office 2,732,428
Patented Jan. 24, 1956

2,732,428

REGENERATIVE REPEATERS FOR USE IN TELEGRAPH SYSTEMS

Gordon T. Dain and Arthur V. Williams, Taplow, England, assignors to British Telecommunications Research Limited, Taplow, England, a British company Application January 4, 1951, Serial No. 204,448

Claims priority, application Great Britain January 17, 1950

10 Claims. (Cl. 178—70)

The present invention relates to regenerative repeaters for use in telegraph systems of the start-stop type and is more particularly concerned with repeaters making use of electronic devices for effecting regeneration as opposed to mechanical arrangements which have been used in the past. The invention moreover is concerned with regenerative repeaters of the type in which a momentary sample of an incoming signal is taken at times representing the middle point of elements of a perfectly timed signal and in accordance with the condition which is then found, outgoing signals of correct length are generated. The chief object of the present invention is to produce an improved thermionic regenerative repeater operating on a somewhat different basis whereby greater simplicity and better performance are obtained.

According to the invention a multi-vibrator is arranged to produce pulses which serve to determine the duration of the regenerated signals and also operate a cyclic counter which serves to stop the operation of the multi-vibrator at the end of a character.

According to a subsidiary feature of the invention the start pulse is correctly regenerated even if it is of a duration less than 50% of the correct value so that it would not be detected by sampling at the middle point. At the same time it is arranged that space signals of very short duration which are likely to be spurious, particularly on radio links, do not initiate the transmission of a regeneration cycle but are suppressed. In other words there is a critical value for the length of the incoming start signal; below this value no re-transmission takes place but above this value, even if it is less than 50%, a start pulse of correct length is generated.

It is also arranged that the stop signal is generated locally at the correct time regardless of the condition of the incoming line relay and moreover the line relay is maintained in mark condition so as to prevent false operation if a signal simulating a new start signal is received at this time.

Figure 1:
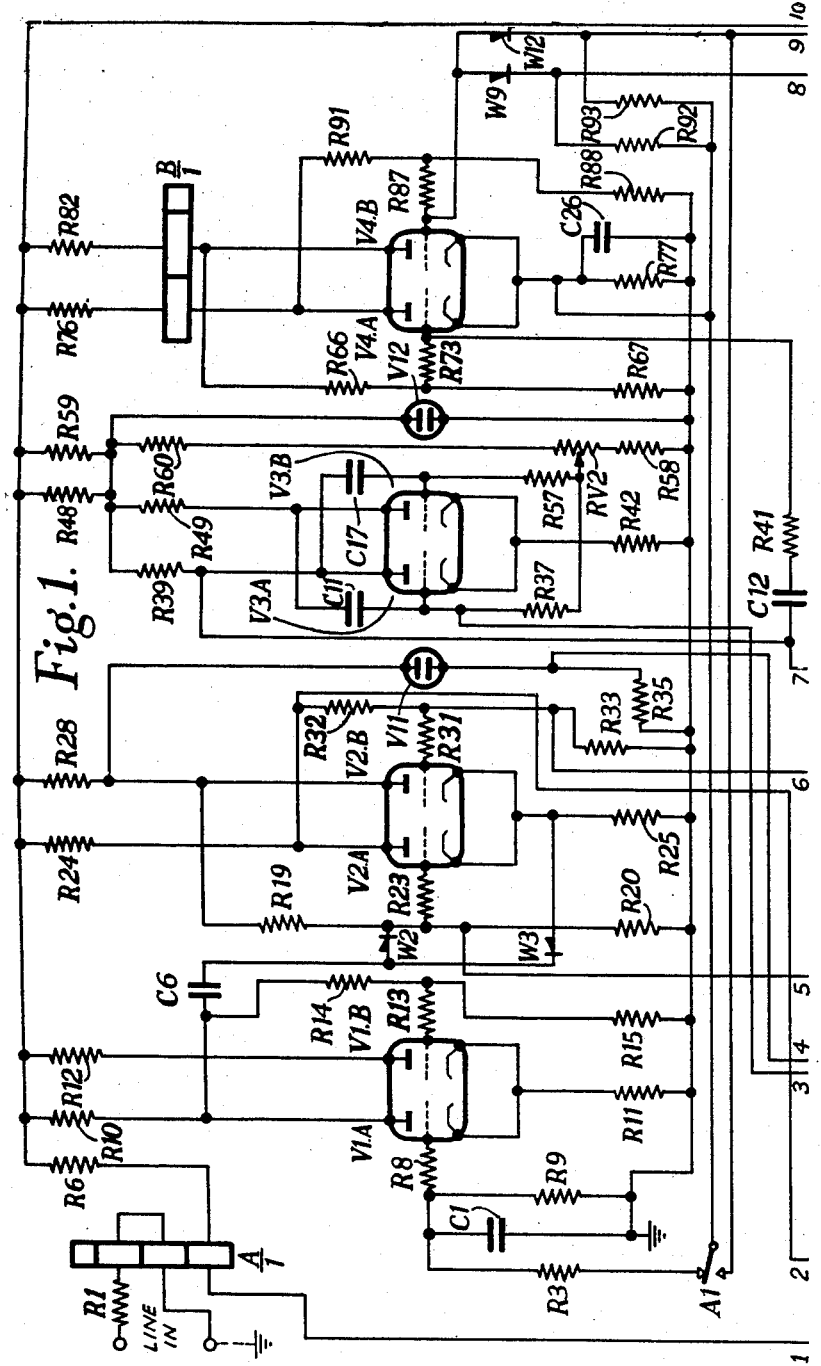
Figure 2:
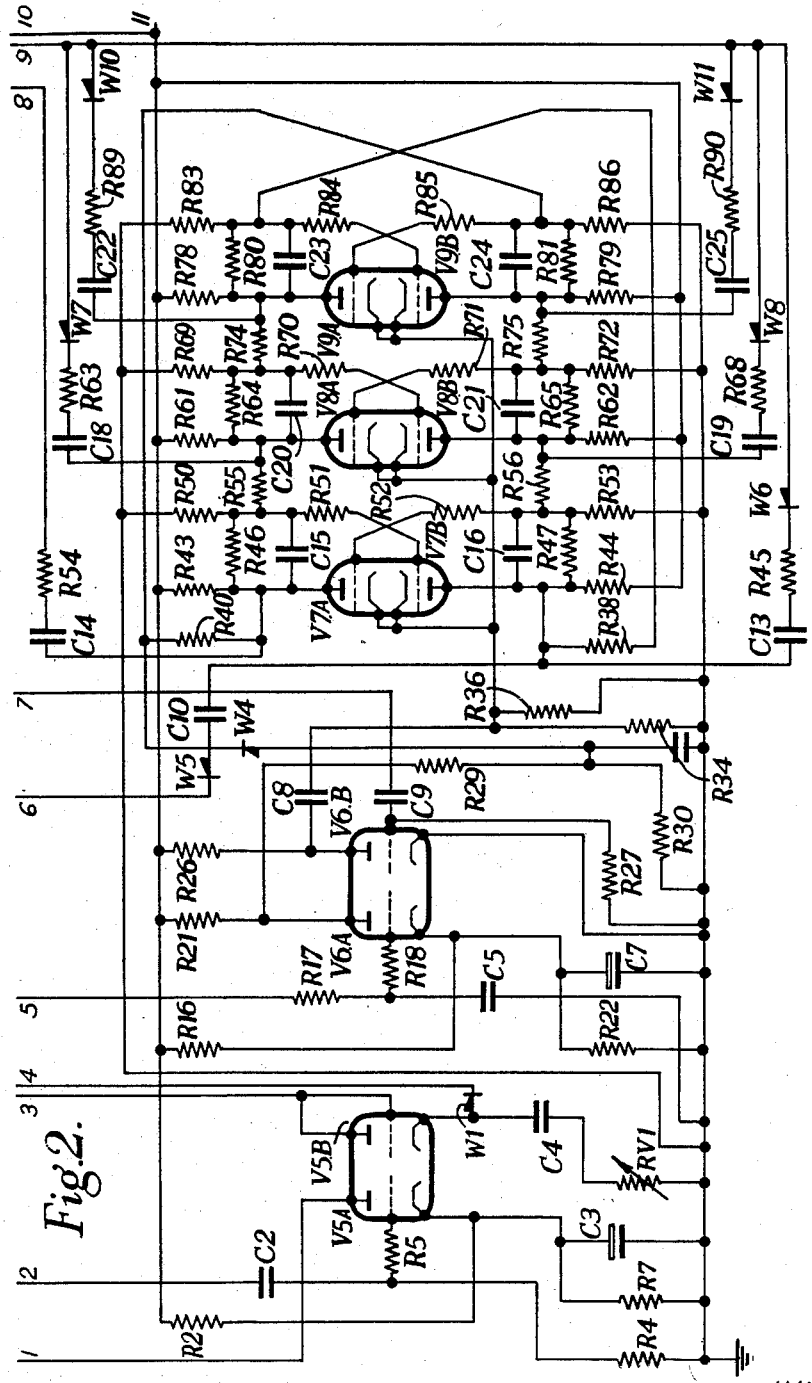
Figure 4:
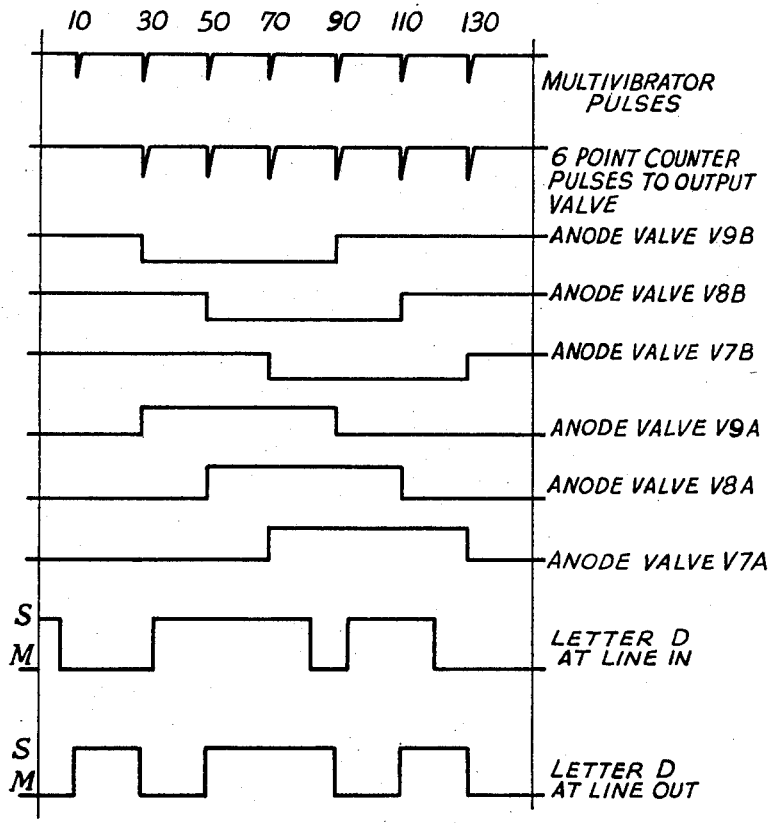

The invention will be better understood from the following description of one method of carrying it into effect which should be taken in conjunction with the accompanying drawings comprising Figs. 1–5. Figs. 1–3, which should be arranged with Fig. 2 beneath Fig. 1 and Fig. 3 to the right, represent a circuit diagram of a complete regenerative repeater according to the present invention. Fig. 4 is a time sequence diagram indicating the relative instants of operation of certain of the components, and Fig. 5 indicates the relative potentials on the electrodes of the counter valves so as to enable the operation of the counter to be more readily understood.

The general method of operation is that when a start signal is received, a timing operation is initiated and after a predetermined delay period representing approximately half a signal element, a multivibrator is set in operation to cause a six-point cyclic counter to generate short sampling or scrutinising pulses at a predetermined frequency. The first multivibrator pulse fails to operate the counter but causes a space pulse of correct length to be sent over the outgoing circuit. The remaining six pulses from the multivibrator cause the six-point cyclic counter to make a complete cycle of events and the sixth counter pulse causes the multivibrator to be held at rest. In accordance with the result of the successive sampling operations, corresponding pulses of standard length are transmitted over the outgoing circuit in addition to the start pulse, with the qualification that the final pulse corresponding to the stop element is provided regardless of the incoming signal. It is arranged that the initial incoming pulse representing a start signal must persist for a predetermined period if the cycle set out above is to be carried through. Hence spurious signals of shorter duration produce no effect on the output circuit and thus important possibilities of interference, particularly on radio circuits, are cut out.

A more detailed description will now be given of the regenerative repeater shown. It makes use of two telegraph relays, nine thermionic valves all of the double-triode type and preferably identical, and two gas discharge tubes, conveniently neon tubes.

The telegraph relays A and B are shown operated to the "mark," i. e. idle position. In this position the valves are in the condition given in the table below:

| | |
|---|---|
| V1A conducting | V1B cut-off |
| V2A cut-off | V2B conducting |
| V3A cut-off | V3B conducting |
| V4A conducting | V4B cut-off |
| V5A cut-off | V5B conducting |
| V6A cut-off | V6B conducting |
| V7A conducting | V7B cut-off |
| V8A conducting | V8B cut-off |
| V9A conducting | V9B cut-off |
| V11 non-conducting | V12 conducting |

At this time no current flows through the lower coil of relay A since valve V5A is cut off. Incoming signals from "Line In" are applied to the upper and middle coils of this relay which therefore under these conditions follows the incoming signals faithfully.

The first space signal appearing on "Line In" operates the relay contact A1 to the alternate position. The moving contact A1 has a positive potential applied to it by reason of the fact that it is joined to the cathodes of valves V4A and V4B and valve V4A is conducting. Consequently when the tongue assumes the alternate position, capacitor C1, which had been held charged by this potential, now discharges via resistor R9. When capacitor C1 is sufficiently discharged, valve V1A is cut off and its anode voltage rises, causing the voltage on the grid of valve V1B which is connected thereto to rise also and make this valve conduct. Resistor R9 and capacitor C1 have a time constant so arranged that if contact A1 restores to its original position before a period of approximately 3 milliseconds has elapsed, valves V1A and V1B are not triggered. Short duration spurious space signals are therefore suppressed.

When the valve V1A is cut off, a positive pulse is applied to the grid of valve V2A by way of capacitor C6 and rectifier W2 and causes this valve to conduct, and a negative pulse from its anode causes valve V2B to be cut off. Valves V2A and V2B thus constitute a trigger circuit.

When valve V2B is cut off, the voltage on its anode rises sufficiently to cause the neon tube V11 to strike. A voltage is thus developed across resistor R35 and this voltage is considerably higher than the voltage on the grid or valve V3A. Valve V5B is connected as a diode and as the voltage on its cathode rises due to V11 striking, it becomes an infinite impedance by way of leads 3 and 4 between R35 and the grid of valve V3A. Under these conditions capacitor C11 reaches the conducting voltage for this valve very quickly. It will be appreciated that valves V3A and V3B are connected as a multivibrator which then continues to oscillate until tube V11 is extinguished. The tube V12 is a stabilising tube which is permanently conducting and serves to maintain a constant voltage for stable operation of the multivibrator.

When neon tube V11 conducts and the voltage is raised to a high value across resistor R35, this voltage is applied via lead 4 and rectifier W1 across capacitor C4 and variable resistor RV1. This combination forms an integrating circuit so that the voltage applied to the cathode of valve V5B does not rise to its full value immediately and cause the valve to cut off and so cause the multivibrator to start, but is delayed by a time dependent on the values of the combination. These values are so arranged that the multivibrator delivers its first pulse approximately 10 milliseconds after the relay A has been operated to the space position. The delay period is arranged to be variable about a value of 10 milliseconds for purposes of orientation but is assumed to be 10 milliseconds for the purpose of this description.

The multivibrator is adjusted by RV2 to the required speed of transmission, viz. 50 C./S. for the usual 20 millisecond elements. During its running period the multivibrator delivers seven negative pulses from the valve V3A anode over lead 7 to the grid of the driver valve V6B via capacitor C9 and also to the grid of valve V4A via capacitor C12 and resistor R41. The anode of valve V6B thus delivers seven positive pulses to the cathodes of valves V7A, V7B, V8A, V8B, V9A and V9B through the capacitor C8. The cathode load for these valves consists of resistors R34 and R36.

Figure 5:

Consider now the counter circuit. The six-point cyclic counter has a symmetrical circuit, and the anode connections from one valve, say V8A, to the next valve V9A comprise capacitor C20 in parallel with resistor R64 and joined to resistor R74. Similarly the anode of valve V9A is joined to the anode of valve V7B via capacitor C23 in parallel with resistor R80 and joined to resistor R38. The respective resistors and capacitors are equal in value e. g. the values of resistors R46, R64, R80, R47, R65 and R81 are identical. Considering the counter as a whole, at any time three adjacent valves will be conducting and the remaining three valves cut off. This may be seen by considering the potentials existing on the various grids of the counter valves as indicated in Fig. 5. Assume that valves V7A, V8A and V9A are conducting and valves V7B, V8B and V9B are cut off, which as will be seen later is the position in the idle condition, i. e. with the multivibrator not operating, the anodes of valves V7A and V8A will be low in potential and consequently the grid of valve V7B will also be of low potential as it is joined by resistor R51 to the junction of resistors R46 and R55 which is connected by way of resistor R50 to earth. In a similar manner the grid of valve V8B will be of low potential. The valves V7B and V8B will thus be cut off which is the required condition. In a similar manner, as the anodes of valves V7B, V8B and V9B, are high in potential, the grids of valves V7A and V8A respectively are of high potential, which is the required condition. Valve V9A is assumed to be conducting and its anode potential is low while valve V7B is cut off and its anode potential is high. Resistor R80 is of much smaller value than resistor R38 and consequently the potential existing at the junction of these resistors is somewhat below cathode potential as shown in Fig. 5. As valve V9B is cut off, its anode will be of high potential and as valve V7A is conducting, its anode will be of low potential. As before, resistor R81 is of smaller value than resistor R40 so that the potential of the grid of valve V9A will be somewhat above cathode potential as shown in Fig. 5. It will thus be seen that the potentials existing on the grids of the counter valves are of the required values to maintain valves V7A, V8A and V9A conducting and valves V7B, V8B and V9B cut off.

If now a positive pulse is applied to the cathodes of the counter valves of amplitude as shown in Fig. 5, it will only be sufficient to cause valve V9A to be cut off. When valve V9A is cut off, its anode delivers a positive pulse via capacitor C23 and resistor R84 to the grid of valve V9B and causes the latter to conduct. Valves V7A, V8A and V9B are now conducting and valves V7B, V8B and V9A are cut off, and as the circuit is symmetrical, a new stable state is attained which lasts until the next cathode pulse is received. It will be appreciated that on successive cathode pulses the states of the counter anodes will be as shown in Fig. 4.

Valve V6A is arranged to cut off in the idle condition by including in its cathode circuit a potential divider consisting of resistors R22 and R16. In this condition its anode potential is high and this potential is applied through resistor R29 and rectifier W4, which is in the conducting or low condition, to the junction of resistors R81 and R40. This causes the counter to be inoperative to cathode pulses as the grid of valve V9A is maintained at a higher potential than the cathode. When valves V2A and V2B are triggered from a start space signal, a positive pulse is delivered from the junction of resistors R19 and R20 through resistor R17 to capacitor C5 and resistor R18. This high potential is maintained at the junction of resistors R19 and R20 but is not immediately effective at the grid of valve V6A due to the need for charging capacitor C5.

After a predetermined time, valve V6A conducts and its anode falls to a lower potential which causes the rectifier W4 to assume its high or cut-off condition. The counter is now no longer held in its inoperative condition and cathode pulses cause the counter anodes to assume successively the potentials as shown in Fig. 4. The purpose of the delay feature given by valve V6A is to hold the counter inoperative until the first multivibrator pulse has disappeared, and the values of resistors R17, R18 and capacitor C5 are so chosen as to attain this end. It will now be appreciated that in response to a series of seven multivibrator pulses a series of six pulses from the anodes of the counter are obtained and these pulses are coincident in time with the last six pulses from the multivibrator as shown in Fig. 4.

The output circuit consists of valves V4A and V4B arranged in the form of a trigger circuit in the anodes of which are the coils of the output or retransmitting relay B and which are so arranged that current flowing through valve V4A operates the relay B to its mark condition and current through valve V4B operates the relay B to its space condition.

The first negative multivibrator pulse via capacitor 12 and resistor R41 to the grid of valve V4A causes valve V4A to be cut off and valve V4B to conduct. Consequently a space signal is sent to "Line Out."

For the purpose of description consider the letter D being received at "Line In" after having suffered some degree of distortion as indicated in Fig. 4. At time 30 milliseconds after the commencement of the start signal a mark potential is existing and the contact A1 will be in its upper position. The first negative counter pulse occurs at this time and is derived from the anode of valve V9B. This pulse is applied through capacitor C25, resistor R90 and rectifier W11 to a common point which is connected to the grid of valve V4B through lead 9 and rectifier W12. The pulse is thus applied to the grid of valve V4B and at the same time a negative pulse from the multivibrator is applied to the grid of valve V4A. Pulses from the counter, however, have a larger amplitude and time constant so that if a counter pulse and a multivibrator pulse are applied to the counter trigger valves V4A and V4B simultaneously, the counter pulse takes control and causes valve V4A to conduct and valve V4B to be cut off, resulting in a mark condition being sent to "Line Out." Thus at time 30 milliseconds after the commencement of the start space signal at "Line In," a mark signal is transmitted at "Line Out."

At time 50 milliseconds from the commencement of the signal, relay A will be in the space condition and contact A1 will be in its lower position. The counter pulse occurring at this time, i. e. that due to the valve V8B conducting, which is extended by way of capacitor C19, resistor R68 and rectifier W8 to the common connection, will be absorbed by the large value capacitor C26 through the path provided by the lower contact A1 of relay A. This pulse will thus not reach the grid of valve V4B, but at the same time a negative pulse is delivered from the multivibrator to the grid of valve V4A which causes valve V4A to be cut off and valve V4B to conduct. Thus the output relay B will transmit a space signal to "Line Out."

In a similar manner the remaining three code element signals are scrutinised and are transmitted to "Line Out" in a corrected distortionless form. The stop signal is not sampled or scrutinised by the last counter pulse as it is always a mark signal so when valve V7A is made conducting by the seventh multivibrator pulse, a negative pulse is sent from its anode through capacitor C14, resistor R54, lead 8 and rectifier W9 to the grid of valve V4B where it causes this valve to cut off and valve V4A to conduct. A stop signal is thus transmitted to "Line Out."

As valve V7A is made conducting by the seventh multivibrator pulse, valve V7B will be cut off as shown in Fig. 4. The positive potential resulting is applied as a pulse through capacitor C10 and rectifier W5 and over lead 6 to the grid circuit of valve V2B and causes this valve to conduct and valve V2A to be cut off. Tube V11 is connected to the anode of valve V2B and the drop in anode potential when valve V2B conducts causes tube V11 to be extinguished and hence the multivibrator is now held at rest by the reduction in potential on the grid of V3A.

It will now be seen that should the repeater be switched on and the trigger valves V2A and V2B be in the condition such that the multivibrator oscillates, it will drive the counter until the resetting pulse from the counter is applied to retrigger valves V2A and V2B and cause the multivibrator to come to rest. Thus the assumption that valves V7A, V8A and V9A are conducting and valves V7B, V8B and V9B are cut off is shown to be justified.

The re-triggering of valves V2A and V2B cause a negative pulse to be extended to the grid of valve V6A by way of resistor R19, lead 5, resistors R17 and R18, and valve V6A will be cut off. In addition a positive pulse is extended via lead 2, capacitor C2 and resistor R5 from the anode of valve V2A to the grid of valve V5A. Valve V5A conducts and anode current flows over lead 1 through the lower coil of relay A and resistor R6. This causes contacts A1 to assume a mark condition irrespective of the signalling condition on the line. This condition lasts for approximately 10 milliseconds and is dependent on the values of capacitor C2 and resistor R4. This feature prevents the premature re-operation of the repeater should a space condition exist during the stop signal element due to radio interference.

The equipment shown in Fig. 3 represents the power pack and it will be seen A. C. mains are connected over switch S1 and fuse F2 to transformer T1, different tappings being provided for different mains voltages. The transformer T1 is provided with three secondary windings, one supplying the heater of the rectifier valve V10, the second which is centre-tapped, supplying heating current to the valves V1—V9 and the third, which is also centre-tapped, being connected to the anodes of the rectifier valve. The D. C. supply circuit over lead 10 includes fuse F1, resistor R94 and smoothing network comprising capacitors C27 and C28 and inductor L1.

The contacts B1 of the retransmitting relay B have associated with them for spark quenching and signal shaping purposes the inductors L2, L3 and L4, resistors R95 and R96 and capacitors C29, C30, C31, C32 and C33. It will be understood that terminal T is connected to the outgoing line and terminals M and S to the mark and space batteries respectively.

We claim:

1. In a regenerative repeater for start-stop telegraph systems, a multivibrator having a period equal to the length of each code element, a receiving relay, means responsive to the operation of said receiving relay on receipt of a signal of the polarity of a start signal for setting said multivibrator in operation to generate pulses, a cyclic counter, means for transmitting pulses from said multivibrator to said counter to effect its sequential operation, means in said counter for generating pulses, a retransmitting relay, means for transmitting pulses from said counter to said retransmitting relay, means responsive to each pulse from said counter for setting said retransmitting relay in accordance with the instantaneous setting of said receiving relay and means in said counter for stopping the operation of said multivibrator in response to the receipt of a predetermined number of pulses.

2. In a regenerative repeater for start-stop telegraph systems, a multivibrator having a period equal to the length of each code element, a timing device, means responsive to the receipt of a signal of the polarity of a start signal for setting said timing device in operation, means for terminating the operation of said timing device on the cessation of said signal, means controlled by said timing device if it remains in operation for a predetermined time for setting said multivibrator in operation to generate pulses, a cyclic counter, means for transmitting pulses from said multivibrator to said counter to effect its sequential operation, means in said counter for generating pulses, a receiving relay, a retransmitting relay, means for transmitting pulses from said counter to said retransmitting relay, means responsive to each pulse from said counter for setting said retransmitting relay in accordance with the instantaneous setting of said receiving relay and means in said counter for stopping the operation of said multivibrator in response to the receipt of a predetermined number of pulses.

3. In a regenerative repeater for start-stop telegraph systems, a multivibrator having a period equal to the length of each code element, a receiving relay, means responsive to the operation of said receiving relay on receipt of a signal of the polarity of a start signal for setting said multivibrator in operation to generate pulses, a cyclic counter, means for transmitting pulses from said multivibrator to said counter to effect its sequential operation, means in said counter for generating pulses, a trigger circuit comprising a pair of triodes, means for transmitting pulses from said multivibrator to the grid of one member of said trigger circuit, means for transmitting pulses from said counter to the grid of the other member of said trigger circuit if said receiving relay is in the mark condition, a retransmitting relay provided with two opposing windings connected respectively to the anodes of said triodes the pulses from said counter being of greater duration and amplitude than the pulses from said multivibrator so that the pulses from said counter predominate if pulses are received from both sources simultaneously and said retransmitting relay accordingly takes up a position corresponding to a mark condition and means in said counter for stopping the operation of said multivibrator in response to the receipt of a predetermined number of pulses.

4. In a regenerative repeater according to claim 3, a capacitor of large value, contacts on said receiving relay and circuit connections to said contacts whereby if said receiving relay is in the space condition said capacitor is connected in circuit so that pulses from said counter are transmitted to said capacitor and therefore do not appreciably change the potential of the grid of said other member of said trigger circuit.

5. In a regenerative repeater according to claim 3, means controlled by said counter for transmitting a pulse to said trigger circuit in the position of the stop element of a character regardless of the instantaneous position of said receiving relay.

6. A regenerative repeater according to claim 1, in which said counter is of the electronic type comprising six thermionic valves in association with means for preventing the first impulse from said multivibrator from affecting the counter.

7. In a regenerative repeater according to claim 6, circuit connections whereby the pulses from said multivibrator are applied simultaneously to the cathodes of all the valves of said counter.

8. In a regenerative repeater for start-stop telegraph systems, a multivibrator having a period equal to the length of each code element, a first timing device, means responsive to the receipt of a signal of the polarity of a start signal for setting said first timing device in operation, means for terminating the operation of said first timing device on the cessation of said signal, means controlled by said first timing device if it remains in operation for a predetermined time for initiating the operation of said multivibrator regardless of a subsequent duration of said signal, a second timing device, and means controlled by said second timing device for delaying the start of the operation of said multi-vibrator for a predetermined period after the commencement of said signal.

9. In a regenerative repeater for start-stop telegraph systems, a multi-vibrator having a period equal to the length of each code element, a first progressively operating timing device, means responsive to the receipt of a signal of the polarity of a start signal for setting said first timing device in operation, means for resetting said first timing device on the cessation of said signal, means controlled by said first timing device on completing its operation for initiating the operation of said multi-vibrator regardless of the subsequent duration of said signal, means for inhibiting the operation of said multi-vibrator after said operation has been initiated, a second progressively operating timing device, means for setting said second timing device in operation responsive to the first timing device completing its operation and means controlled by said second timing device on completing its operation for disabling said inhibiting means so as to permit the operation of said multivibrator to commence.

10. In a regenerative repeater for start-stop telegraph systems, a multivibrator having a period equal to the length of each code element, a first timing device, means responsive to the receipt of a signal of the polarity of a start signal for setting said first timing device in operation, means for terminating the operation of said first timing device on the cessation of said signal, means controlled by said first timing device if it remains in operation for a predetermined time for initiating the operation of said multi-vibrator regardless of the subsequent duration of said signal, a second timing device, means controlled by said second timing device for delaying the start of the operation of said multi-vibrator for a predetermined period after the commencement of said signal, a cyclic counter, means for transmitting pulses from said multi-vibrator to said counter to effect its sequential operation, and means in said counter for stopping the operation of said multi-vibrator in response to the receipt of a predetermined number of pulses.

References Cited in the file of this patent
UNITED STATES PATENTS

| | | |
|---|---|---|
| 2,430,547 | Anderson et al. | Nov. 11, 1947 |
| 2,454,089 | Rea et al. | Nov. 16, 1948 |